United States Patent [19]

Southard

[11] Patent Number: 4,466,098
[45] Date of Patent: Aug. 14, 1984

[54] CROSS CHANNEL CIRCUIT FOR AN ELECTRONIC SYSTEM HAVING TWO OR MORE REDUNDANT COMPUTERS

[75] Inventor: Gary Southard, Coral Springs, Fla.

[73] Assignee: Siemens Corporation, Iselin, N.J.

[21] Appl. No.: 387,700

[22] Filed: Jun. 11, 1982

[51] Int. Cl.³ .................... G06F 11/20; H04M 3/08
[52] U.S. Cl. .................................. 371/9; 179/18 EE
[58] Field of Search .............. 179/18 EE, 18 ES; 371/9; 364/187

[56] References Cited

U.S. PATENT DOCUMENTS

4,358,823  11/1982  McDonald et al. ............... 364/200
4,371,754   2/1983  De et al. ........................ 179/18 EE Primary Examiner—Thomas W. Brown
Attorney, Agent, or Firm—Karl F. Milde, Jr.; Andrew G. Rodau

[57] ABSTRACT

An electronic system, such as a telephone exchange, including at least two, redundant computers. One computer is operated in the active mode while one or more are maintained in a hot "standby mode" in readiness to take over the tasks of the active computer if this computer should fail. At least one "cross channel circuit" is provided for updating the memory of the standby computer(s) in accordance with changes made in the contents of the memory of the active computer. The cross channel circuit changes the contents of the memory of the standby computer only at addresses which are within a prescribed, contiguous range of addresses.

9 Claims, 4 Drawing Figures

CROSS CHANNEL CIRCUIT FOR AN ELECTRONIC SYSTEM HAVING TWO OR MORE REDUNDANT COMPUTERS

BACKGROUND OF THE INVENTION

It is well known to provide electronic systems with redundant elements so as to insure continuing operation should one or more of the elements fail. With electronic systems which are controlled by a programmable element such as a computer, this system may include two or more computers plus suitable control circuitry for monitoring failures and controlling the computer outputs in response to a failure.

Typical electronic systems that require the added security of redundant computers are (1) on-line data processing systems as are used, for example, in banking, travel reservations and time sharing systems; (2) real time electronic control systems as are used in chemical plants, utility power systems, and in air and spacecraft; and (3) telecommunications systems such as telephone exchanges, packet switching systems, satellite relay stations and the like. With many other system applications, redundancy may not be necessary but it may be desirable in instances where it is costly when the electronic system is idle.

There are basically two types of operation for redundant computers: (1) systems in which all the computers are run synchronously and process the same input information so that all the computers have exactly the same memory states and status at any given moment of time; and (2) systems in which one computer is operated in an active mode and one or more other computers are maintained in a "hot standby" mode in readiness to take over the tasks of the active computer if this computer should fail.

The German Auslegeschrift No. 2 005 310 discloses a circuit arrangement for monitoring two, redundant elements VE1 and VE2 of a telecommunications exchange which are operated synchronously and in parallel so that the signals appearing in both their inputs and their outputs are (or should be) equal. With this known arrangement, the output signals of the two exchange elements are monitored by a comparator V which produces an output signal if the signals at any two corresponding outputs of the exchange elements are unequal. The output signal of the comparator V is supplied to a reset gate RT that passes a reset signal e0 to the two exchange elements VE1 and VE2 causing these elements to repeat the operating steps which led to the failure. Further testing devices P1 and P2 monitor the outputs of the exchange elements VE1 and VE2 and produce an output alarm signal if the expected output signals of the exchange elements fail to appear. This alarm signal serves to switch off the respective exchange element via a control switch S1 or S2, and inhibits the operation of the gate RT so that the output signal from the comparator V will not be supplied as a reset signal e0. The presence of the alarm signal is also indicated by an indicator lamp, SI1 or SI2.

Whereas a redundant electronic system of this type operates with the desired degree of security, the use of two identical exchange elements operating in synchronism has two disadvantages:

(1) Although simple hard-wired systems may be easily synchronized, it becomes more difficult to synchronize systems as these systems become more complex. With software controlled systems, in particular, there is a randomness in the amount of time that the system takes to execute a specific task. As a result, the systems will seldom operate exactly in synchronism and, consequently, will not have the identical memory states at any given moment in time. Consequently, if one redundant computer should fail, the other cannot immediately take over.

(2) Another disadvantage is that, while only one unit is actually required to execute the application tasks, the additional, redundant unit or units are totally occupied by the synchronous operation and are not permitted to perform any other, less critical tasks.

These disadvantages are overcome by an electronic system in which one computer is operated in an active mode to perform all critical tasks whereas the other, redundant computer or computers are operated in a standby mode and are allowed to carry out less critical tasks such as routine "housekeeping". The German Pat. No. 2,056,535 discloses such a system in which a telecommunication (telephone) exchange is centrally controlled by either a main computer BR or a standby (reserve) computer RR. The main computer normally serves to carry out, by itself, all the required processing for operation of the exchange with the aid of certain fixed data stored in its memory. The other computer RR is operated in a standby mode and takes over for the active computer BR when this active computer becomes inoperable for any reason. During normal operation, the standby computer RR is allowed to carry out routine tasks, such as error detection, which are not critical to the service provided by the exchange.

The aforementioned patent is concerned with the manner in which fixed data, such as telephone numbers and the like, are changed in the memories of both the active and standby computers. It is assumed that these two computers operate with fixed, rather than variable data so that the computer memories do not require continual updating during operation of the exchange.

SUMMARY OF THE INVENTION

An object of the present invention is to provide an electronic system having an active computer and at least one redundant, standby computer which is capable, upon command, of assuming the tasks of the active computer.

It is a further object of the present invention to provide an electronic system of the above-noted type in which the memory of the active computer contains data that changes in real time and in which the data is correspondingly changed at corresponding addresses in the memory of the standby computer.

These objects, as well as other objects which will become apparent from the discussion that follows, are achieved, according to the present invention, by providing at least one cross channel circuit for updating the memory(s) of the standby computer(s) in accordance with certain changes made in the contents of the memory of the active computer.

For the purpose of explanation, it will be assumed that both the active and the standby computer comprise a central processing unit (CPU), a random access memory (RAM) and a plurality of bus lines interconnecting the CPU and the memory for transmitting address, data and control information between the CPU and the memory. The two or more computers may also include one or more input/output (I/O) devices connected to the bus lines to permit communication between the computers and the rest of the electronic system of which they form a part. For example, the electronic system may be a telecommunications exchange having a plurality of trunk and tie line circuits, at least one signalling tone receiver and at least one tone generator, each connected to the line circuits, and a switching network connected to the line circuits for interconnecting selected trunk and tie lines under control of the active computer.

According to a preferred embodiment of the invention, each cross channel circuit includes (1) a comparator, connected to those bus lines of the active computer which carry address information, for determining and signalling whether the current address transmitted on the bus lines lies within a prescribed, preferably contiguous, range of addresses; (2) a logic unit, connected to those bus lines of the active computer which carry control information, for determining and signalling when a write operation is being performed in the memory of the active computer; and (3) a connecting circuit, interconnecting certain bus lines of the active with the standby computer, for transmitting address, data and write control information received from the bus of the active computer to the bus of the standby computer in response to signals from the comparator and the logic unit indicative that a write operation is being performed in the memory of the active computer at an address that lies within the prescribed range.

With the cross channel circuit just described, the data written into the memory of the active computer at an address within the prescribed range is also written into the memory of the standby computer at the same address. Stated another way, data written into the memory of the active computer which is *outside* the prescribed range is *not* written into the memory of the standby computer. It is thus possible to define a limited space within the memory of the active computer (as well as the standby computer) which contains or is to contain the variable data upon which the computers operate when in the active mode. Other variable data, such as that utilized by the computer when in the standby mode, may lie outside of this range.

Preferably, the device for interconnecting the buses of the active and passive computers includes a FIFO memory, connected to those bus lines of the active computer which carry address and data information, for storing the address and data to be transmitted from the active computer to the standby computer, thereby buffering the stored information to be transmitted until after the transmission is completed. In this way, the active computer can complete its write operation and continue on to perform other operations without waiting for the data written into the memory of the active computer to be also written into the memory of the standby computer.

According to a further feature of the present invention, the logic unit of the cross channel circuit is also operable to determine and signal whether a read operation is being performed in the memory of the active computer. When a read operation is executed and detected by the logic unit, a read operation is performed in the memory of the standby computer at the same address from which the data is read in the active computer and the data read from the memories of the active and standby computers are compared. If this data are unequal, the cross channel circuit produces an alarm signal, indicating that an error has occurred.

As a further error checking feature, a second comparator may be provided to test whether the address transmitted by the connecting circuit to the bus lines of the standby computer (as distinct from the address received from the active computer) lies within a second prescribed range of addresses. This second prescribed range is preferably controllable by the standby computer and, during normal operation, is identical to the first prescribed range of addresses against which the address received from the active computer is tested.

Normally, in a system comprising two, redundant computers, both computers may be operated in either the active or the standby mode. Only one of these computers is operated in the active mode at any one time, the other being then operated in the standby mode. With a system of this type, it is desirable to provide two, identical cross channel circuits so that the data and address information can be routed in either direction from the active to the standby computer. Thus, each cross channel circuit connects the buses of the two computers but provide for information flow in one direction only.

For a full understanding of the present invention, reference should now be made to the following detailed description of the preferred embodiments of the invention and to the accompanying drawings.

DESCRIPTION OF THE PREFERRED EMBODIMENTS

The preferred embodiments of the present invention will now be described with reference to FIGS. 1-4 of the drawings. Identical elements in the various figures are designated with the same reference numerals.

Figure 1:
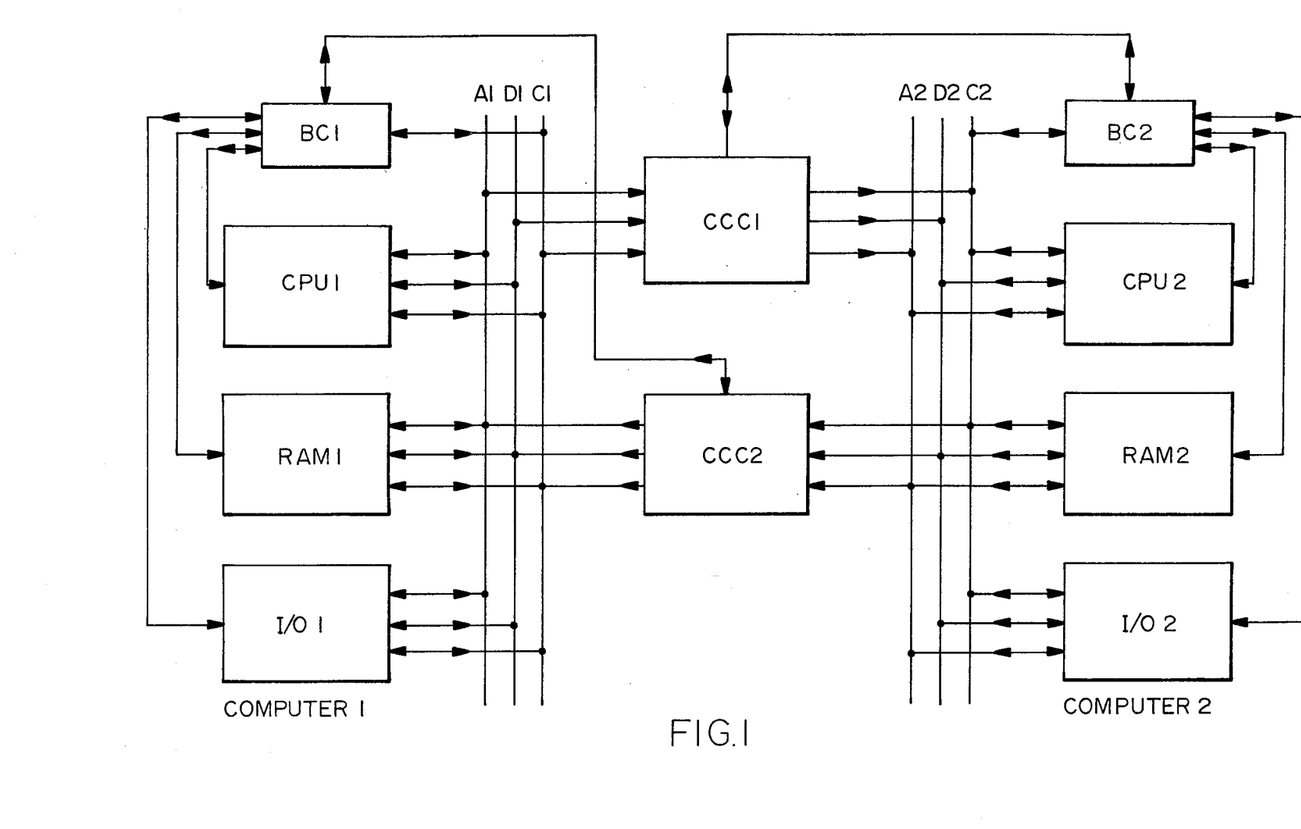
FIG. 1 is a block diagram of an electronic system according to the preferred embodiment of the present invention which includes two, redundant computers and two cross channel circuits.

FIG. 1 shows an electronic system comprising a first computer (computer 1) and a second, redundant computer (computer 2). Both computers include a central processing unit (CPU); a random access memory (RAM); an input-output device (I/O); a plurality of bus lines (A,D, and C) connected to the CPU, RAM and I/O for transmitting address, data and control information, respectively, between these devices; and a bus controller (BC) which controls access to the bus lines by the CPU, RAM and I/O in response to requests for access by these devices and in accordance with a prescribed priority.

It will be understood that the computers, so described, are conventional and are available commercially on either a single printed circuit card or even a single integrated circuit or "chip".

In a preferred application of the present invention, the two, redundant computers are utilized to control the operation of a telephone exchange. As is well known, it is absolutely necessary to provide redundancy in a telephone exchange so that the exchange may continue to operate in case of failure of one of its components. The electronic system according to the present invention serves to facilitate such fail-safe operation while maximizing the utilization of both computers.

A typical telephone exchange, to which the present invention may be applied, has a plurality of trunk and tie line circuits, at least one signalling tone receiver and at least one tone generator each connected to the tie line circuits, and a switching network connected to the tie line circuits for interconnecting selected trunk and tie lines under control of a computer. One such telephone exchange is fully disclosed, for example, in the U.S. Pat. Nos. 4,105,871–4,105,876; 4,113,989 and 4,266,101, such disclosure being incorporated herein by reference.

The electronic system of FIG. 1 operates with one of the two computers in an "active mode" and the other computer in a "standby mode". The computer in active mode attends to the primary tasks of the electronic system, such as controlling a telephone switch, depending upon the application for which the system is designed. Processing takes place in the usual manner by either software stored in the RAM or firmware stored in a read/only memory (ROM) (not shown) which may also be connected to the bus lines A,D, C. The I/O device (or several I/O devices) connected to the bus lines serve to supply data to the computer from the system to be controlled and to transmit data from the computer to the system to be controlled.

According to the invention, the random access memory of the computer operating in standby mode is continuously kept up to date so that its contents (at least those contents related to the tasks of the active computer) remain the same as the contents of the random access memory of the active computer. This memory update function is carried out by a cross channel circuit (CCC) which interconnects the two buses and transmits address, data and control information from one bus to the other for direct memory access (DMA) to the RAM connected to the receiving bus. Since the cross channel circuit in the preferred embodiment of the present invention serves to transmit address, data and control information in one direction only, two cross channel circuits are required if the two computers are capable of alternately operating in both the active and the standby modes. If one computer (e.g., computer 1) is capable of operating in the active mode only, whereas the other computer (computer 2) operates principally in the standby mode but takes over the active mode if the computer 1 should fail or be shut down, then only one cross channel circuit (i.e. CCC1) of the type described below may be required to update the RAM of the computer (computer 2) in the standby mode.

Figure 2:
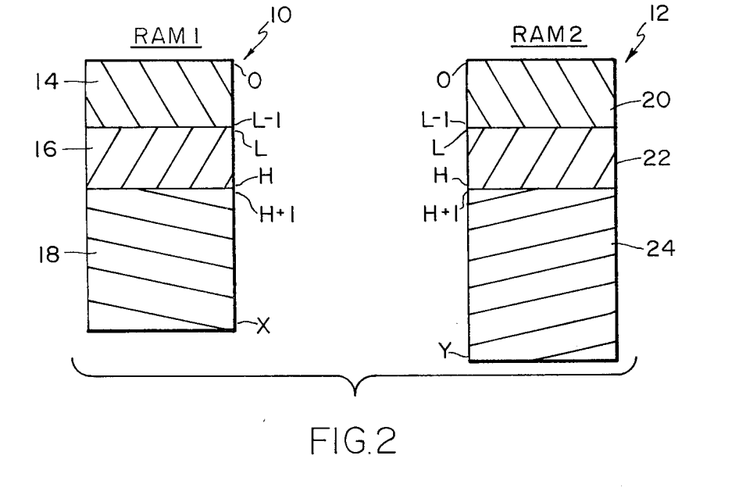
FIG. 2 is a memory map for the two random access memories illustrated in FIG. 1.

FIG. 2 shows maps 10 and 12 of the contents of the memories RAM 1 and RAM 2, respectively, of the computers 1 and 2. The contents 10 of the RAM 1 commence at the lowest address (0) and continue up to its maximum address ("X"). The contents 12 of the RAM 2 are shown as extending from the lowest address (0) up to its maximum address ("Y"). The address Y may be the same or different from the address X, depending upon the sizes of the two memories.

The principle processing tasks of the computer 1, when in the active mode, are carried out by a program 14 which is stored in the region between the lowest address 0 and an address (L−1). Variable data 16 upon which the program 14 operates are stored in a contiguous region between a low address L and a high address H. Other programs and/or data 18, which are not employed in the execution of the primary tasks of the computer 1 when in the active mode are stored in the RAM 1 between the addresses H+1 and X.

The programs and data 18 in the RAM 1 may, for example, relate to a standby mode for this computer, to diagnostics, or to some other non-critical tasks which the computer 1 may perform.

The contents 12 of the RAM 2 are similarly broken down into the program region 20 for the active mode of the computer 2, the variable data region 22 upon which this program operates, and further programs and data region 24 which do not relate to the operation of the computer 2 when in the active mode. The program in region 20 which extends between the addresses 0 and L−1 is to the program in region 14 contained in the RAM 1. The data 22, which lie in the region of memory between the low address L and the high address H, should be the same as the data 16 if the computer 2 is to jump from a standby mode into an active mode and assume, without interruption, the tasks previously performed by the computer 1. The programs and data 24 between the address H+1 and the highest address Y of the memory may, of course, be different from the programs and data 18 contained in the RAM 1 of the computer 1. This region 24 of the RAM 2 contains the standby programs for the computer 2.

The purpose of the cross channel circuit CCC1 according to the present invention is to maintain the variable contents in the region 22 of the RAM 2 identical to the variable contents in the region 16 of the RAM 1 between (and including) the low boundary address L and the high boundary address H.

According to a preferred feature of the present invention, the data stored in the region 22 of the RAM 2 is compared with the data stored in the RAM 1 whenever a read operation is performed in the region 16 of the RAM 1.

Figure 3:
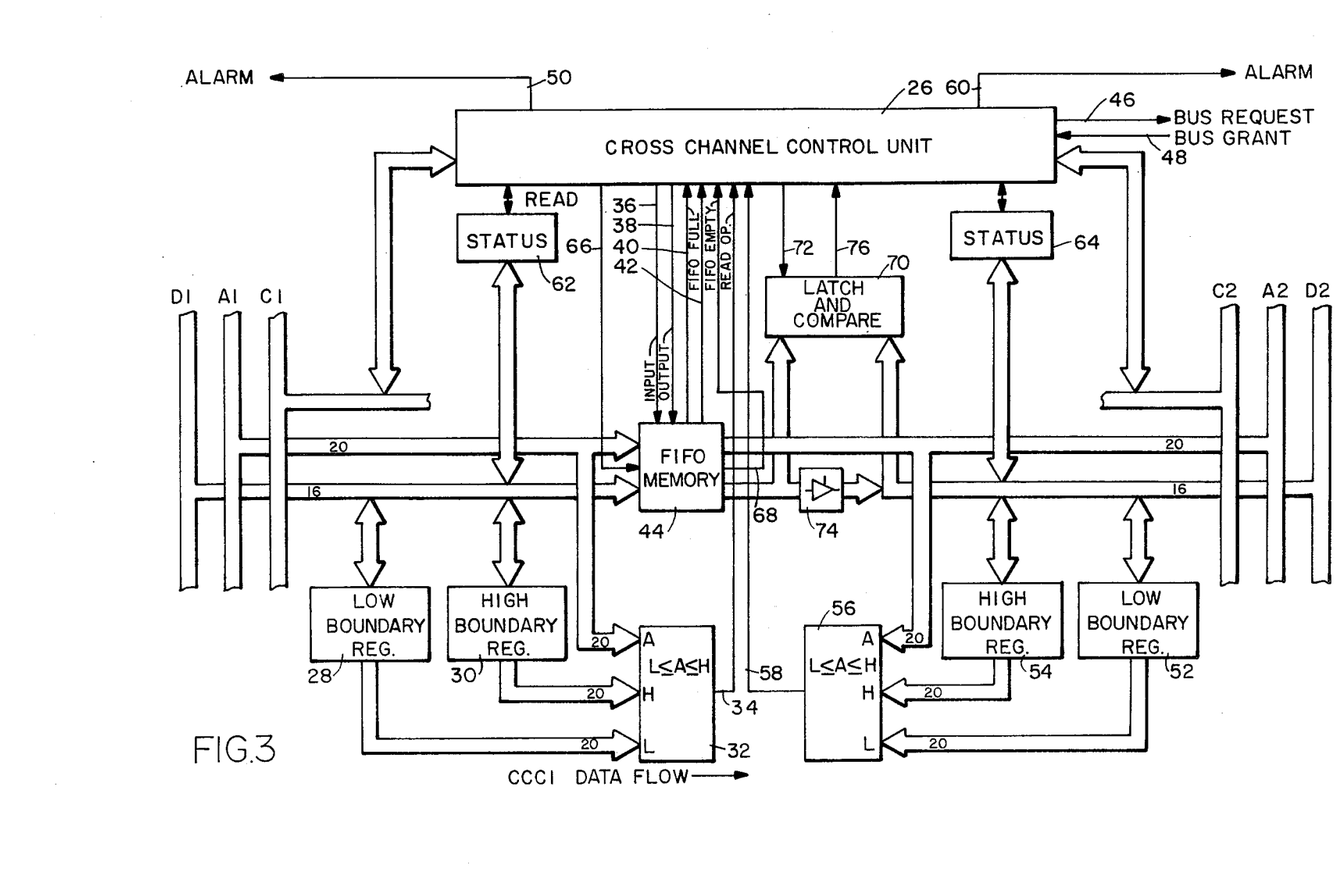
FIG. 3 is a block diagram of a cross channel circuit employed in the electronic system of FIG. 1.

FIG. 3 shows a preferred embodiment of the cross channel circuit CCC1 for the case where both computers 1 and 2 have a mega-byte memory requiring 20 address bits. If the electronic system includes one or more additional cross channel circuits (e.g. CCC2) it (they) may be made identical to the cross channel circuit CCC1. However, in the case of the circuit CCC2, it is turned around so that the data flow is in the opposite direction. The cross channel circuit CCC1 of FIG. 3 transmits address, data and control information from the bus lines A1, D1, C1 of the computer 1 to the bus lines A2, D2, C2 of the computer 2. A second task of the cross channel circuit CCC1 is to compare the data stored in the region 16 of the RAM 1 of the computer 1 with the data stored in the region 22 of the RAM 2 of the computer 2 to check for errors. These functions and tasks are effected in the following manner:

Assuming that the computer 1 is in the active mode and computer 2 is in the standby mode, a cross channel control unit 26 detects when a write memory operation is being executed by the computer 1 by monitoring the control bus lines C1. When a write memory operation is detected, the address A of the operand is tested to determine whether it is in the range between and including the low boundary address L and the high boundary address H. These low and high boundary addresses have previously been stored in address registers 28 and 30. The contents of these registers, as well as the operand address A are supplied to a comparator 32 which determines whether the address A lies within the prescribed range. In other words, the comparator 32 determines whether data is to be written into the region 16 of the RAM 1 (FIG. 2). If $L \leqq A \leqq H$, then the comparator 32 produces an output signal on line 34 which is passed to the cross channel control unit 26.

The low boundary address L and the high boundary address H can be permanently stored in the registers 28 and 30 (by hard-wiring these registers), or they may be supplied to these registers by the active computer via the data bus lines D1 by addressing these registers with appropriate software.

In response to a signal on line 34, the cross channel control unit 26 produces a pulse on line 36 which enables a FIFO memory 44 to latch and store the address and data appearing on bus lines A1 and D1. The cross channel control unit 26 also then produces a bus request signal on line 46 which goes to the bus controller BC2 of the computer 2. When the bus of the computer 2 is available, the bus controller BC2 responds with a bus grant signal on line 48. When this signal is received, the cross channel control unit 26 produces a pulse on line 38 which causes the FIFO memory 44 to read out both the data and address that was previously stored therein. This data and address are then passed to the bus lines D2, A2 of the computer 2 together with signals on the bus lines C2 which effect a write memory operation in the RAM 2.

The control unit 26 always tries to keep the FIFO memory 44 empty so that a FIFO full condition should not occur. However, if the control unit 26 is unable to obtain access to the bus of the computer 2 for an extended period of time, the FIFO memory may eventually become filled. If this occurs, the memory produces a signal "FIFO full" on line 40 which is sent to the control unit 26. This signal sets an alarm flip-flop within the control unit which, in turn, produces an alarm signal on line 50. This alarm signal interrupts the operation of the computer 1 until the FIFO memory becomes empty. When the FIFO memory is empty, it produces a "FIFO empty" signal on line 42 that resets the alarm flip-flop in the control unit 26.

For reasons which will be explained below, a low boundary address register 52, a high boundary address resiger 54 and a comparator 56 are provided on the right-hand side of the circuit shown in FIG. 3 and connected to the address and data bus lines A2, D2 of the computer 2. As in the case of the address registers 28 and 30, the low and high boundary addresses may be preset into the address registers 52 and 54 when the circuit is manufactured or may be supplied via the data bus lines D2 by means of suitable software. The low and high boundary addresses stored in the registers 52 and 54, respectively, are preferably the same as the low and high boundary addresses stored in the registers 28 and 30.

The address registers 52 and 54 and the comparator 56 serve an error checking function in the cross channel circuit. If a write operation is to be performed in the RAM 2 of the computer 2 using the address and data information stored in the FIFO memory 44, the address read from the FIFO is tested to determine whether it is within the range between and including the low boundary address and high boundary address stored in the registers 52 and 54. If the comparator 56 does not produce an output signal on line 58 indicating that the address A falls within the range $L \leqq A \leqq H$, the cross channel control unit 26 does not send out a bus request signal on line 46 to initiate the direct memory access into the RAM 2. Instead, the control unit 26 produces an alarm signal on line 60 which informs the computer 2 that an error has occurred.

If the address A stored in the FIFO memory is within the range bounded by the low and high boundary addresses L and H, a signal is produced on line 58 and a write operation is initiated to write the data read from the FIFO memory into the RAM 2 at the address A.

It is desirable that the low and high boundary address registers 28, 30, 52 and 54 be addressable by their respective computers so that the boundary addresses may be changed during operation of the system. In this way, it is possible, for example, for the standby computer (computer 2) either to reduce the range of acceptable addresses or close off the range entirely if the active computer (computer 1) is operating improperly. The status of the active computer is continuously monitored by the standby computer either by data and address information transmitted from the RAM 1 to the RAM 2 or by separate lines (not shown) carrying signals indicative of failure. The cross channel unit 26 is monitored and controlled by the computer 1 and 2 via control status registers 62 and 64. For example, when the standby computer (computer 2) enters the active mode—e.g. upon failure of the computer 1—it informs the cross channel control unit 26 of this status via the status register 64. In this case, the cross channel control unit 26 interrupts all further data flow from the RAM 1 to the RAM 2.

Alternatively, the computer 1, when in the active mode, can also disable transmissions to the computer 2 if it has received a signal from the computer 2 indicating that this computer has failed or has been taken out of service. In this case, the computer 1 communicates with the cross channel control unit 26 via the status register 62.

As an additional error check, for example of errors which may occur upon failure of the cross channel circuit itself, the data stored in the RAM 2 is read and compared with the data stored in the RAM 1 whenever the computer 1 executes a read operation at an address A within the range between and including the low boundary address L and the high boundary address H. If the cross channel control unit 26 detects a read memory operation via the bus lines C1, it produces a "read" signal on line 66 which is presented to the FIFO memory 44 along with the address and data information from the address and data bus lines A1 and D1. This signal or logic bit is latched into the memory with the address and data information upon receipt of the enable signal on line 36. Thus, each location in the FIFO memory contains 20 bits of address information, 16 bits of data and a single bit indicating whether the address and data resulted from a read or a write operation, respectively, in the RAM 1. If, at the output of the FIFO memory, a read operation is indicated for the next line of stored data and address to be passed out to the computer 2, a signal is transmitted on line 68 to the control unit 26. This control unit enables a latch and compare device 70 via a signal on a line 72 and inhibits the transmission of data to the computer 2 via a bank of control amplifiers 74. The latch and comparator device 70 holds the data received from the FIFO memory 44 until data are received from the corresponding address in the RAM 2. In order to obtain this data, the cross channel control unit 26 produces signals indicative of a read operation on the control bus lines C2 and issues a bus request on line 46. The data received from the RAM 2 are then compared in the latch and compare device 70 to determine whether they are equal to the data originally read out of the RAM 1. If the data are equal, the latch and compare device produces a signal on line 76 indicating equality. If the data are not equal and the control unit 26 fails to receive the expected signal on line 76, a mismatch alarm is transmitted to computers 1 and 2 via lines 50 and 60.

Figure 4:
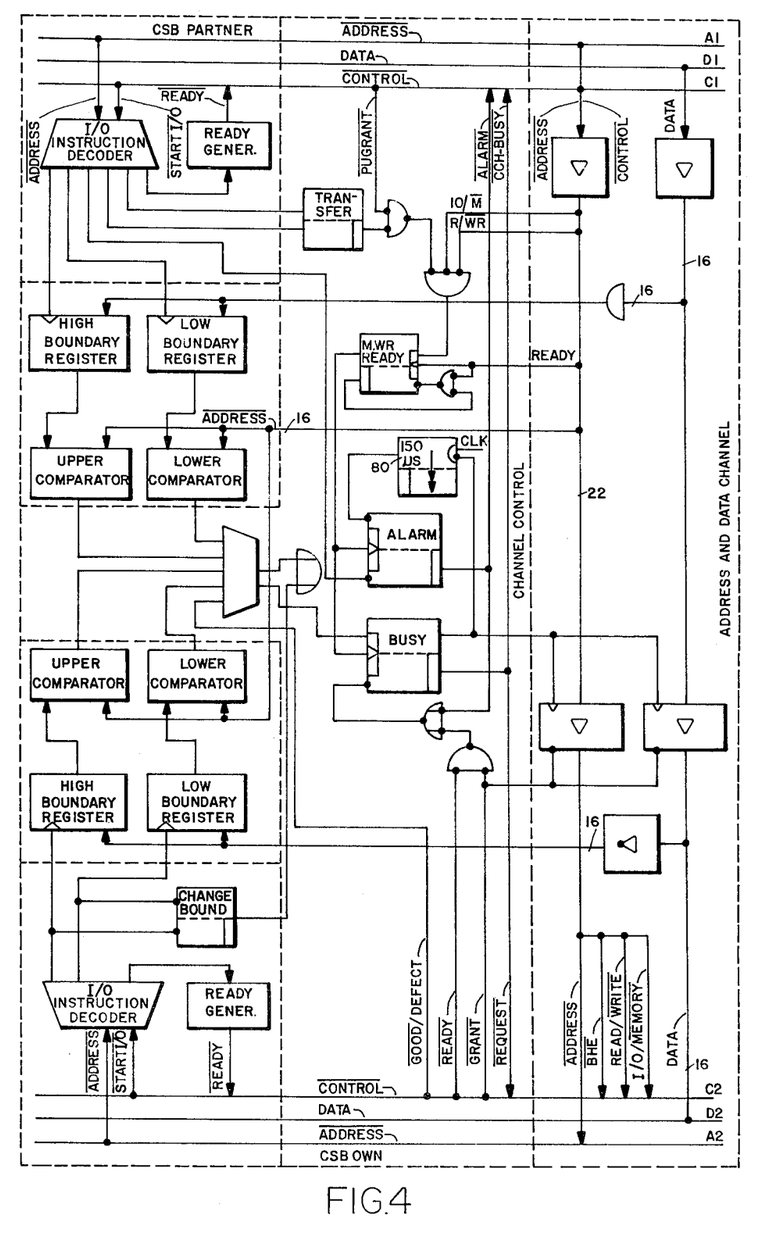
FIG. 4 is a schematic diagram of a simplified cross channel circuit for the electronic system of FIG. 1.

FIG. 4 schematically shows another embodiment of a cross channel circuit. Except for the absence of a FIFO memory and the absence of the feature whereby read checks are performed on the memory of the standby computer, this circuit operates in the same manner as the cross channel circuit shown in FIG. 3.

In order to eliminate the FIFO memory, it is necessary to stop the active computer upon completion of each write operation (at an address A within the range defined by the boundary addresses L and H) until a bus grant is received from the standby computer. Depending upon the tasks to which the standby computer is assigned, this interruption in operation of the active computer may be intolerably long. In any case, the active computer is slowed down somewhat by the absence of the FIFO memory in the cross channel circuit.

In order to insure that the cross channel circuit does not indefinitely interrupt the operation of the active computer (for example, if the standby computer should fail) a 150 microsecond timer 80 is provided to initiate an alarm signal to the computer 1 to cause this computer to continue if a bus grant signal has not been received from the standby computer during the timeout period.

In addition to the timer 80, the central processing unit of each computer has a "watchdog" timer: that is, a retriggerable monostable multivibrator with a 6 millisecond timeout period. This timer is retriggered by the program at least one every program cycle. If the program gets stuck in a loop, the watchdop timer will time out and produce a signal which has certain consequences. In particular, if the watchdop timer of the active computer times out, a failure signal is sent to the standby computer causing it to assume the active mode and take over the tasks of the previously active computer.

With the exception of the FIFO memory and the read check function, the cross channel circuit of FIG. 4 operates in the same manner as does the circuit of FIG. 3. The address and data channel is indicated in dashed lines on the right hand side of FIG. 4. The cross channel control unit is shown in the center region of the figure whereas the high and low boundary address registers and their associated comparators for the computer 1 and computer 2 are illustrated on the left-hand side of FIG. 4.

There has thus been shown and described a novel cross channel control circuit which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is to be limited only by the claims which follow.

I claim:

1. In an electronic system including first and second, redundant computing apparatus, said first apparatus being operable in an active mode and said second apparatus being operable in a standby mode and being capable, upon command, of assuming the tasks of said first computing apparatus, each of said first and second computing apparatus comprising, in combination:
    (a) a central processing unit;
    (b) a random access memory; and
    (c) a plurality of bus lines connecting said processing unit with said memory for transmitting address, data and control information between said processing unit and said memory;

the improvement comprising first cross channel circuit means for updating the memory of said second computing apparatus, when said second apparatus is operating in said standby mode, in accordance with changes made in the contents of said random access memory of said first computing apparatus, when said first apparatus is operating in said active mode, said cross channel circuit means including:
    (1) first means, connected to those bus lines of said first computing apparatus which carry address information, for signalling whether the current address transmitted on such bus lines lies within a first prescribed range of addresses;
    (2) second means, connected to those bus lines of said first computing apparatus which carry control information, for signalling whether a write operation is being performed in the memory of said first computing apparatus; and
    (3) third means, connected to said first means, said second means and to at least some of the bus lines of said first and second computing apparatus, for transmitting address, data and write control information received from the bus of said first computing apparatus to the bus of said second computing apparatus in response to signals from said first and second means indicative that a write operation is being performed in the memory of said first computing apparatus at an address that lies within said prescribed range;

whereby the data written into the memory of said first computing apparatus at an address within said prescribed range is also written into the memory of said second computing apparatus at the same address.

2. The system defined in claim 1, wherein said third means comprises a FIFO memory connected to those bus lines of said first and second computing apparatus which carry address and data information, for storing at least the address and data to be transmitted from the bus lines of said first apparatus to the bus lines of said second apparatus, thereby buffering said address and data information to be transmitted until after the transmission is completed.

3. The system defined in claim 2, wherein said FIFO memory includes means for signalling when it is full, the central processing unit of said first computing apparatus being responsive to a signal that said FIFO memory is full to interrupt its operation at least until further room is available in said FIFO memory.

4. The system defined in claim 1, wherein each of said first and said second computing apparatus further comprise bus controller means for allocating access to the associated bus lines, said bus controller means being responsive to a bus request signal received from any one of the devices connected to its associated bus lines for generating a bus grant signal when such bus lines become available, said device being operable to transmit signals onto the bus lines upon receipt of a bus grant signal from said bus controller means, and wherein said third means include logic means, responsive to signals received from said first and second means, for producing a bus request signal when a write operation is performed in the memory of said first computing apparatus at an address that lies within said prescribed range.

5. The system defined in claim 1, wherein said second means further includes means for signalling whether a read operation is being performed in the memory of said first computing apparatus, and wherein said third means further includes (i) means, responsive to said first and second means, for transmitting read control information onto the bus lines of said second computing apparatus when a read operation is being performed in the memory of said first computing apparatus at an address within said prescribed range, and (ii) latch and comparator means for comparing the data read from the memory of said first computing apparatus at an address within said prescribed range with the data read from the memory of said second computing apparatus at the corresponding address thereof, and for producing an alarm signal if such data are unequal.

6. The system defined in claim 1, further comprising fourth means, connected to said third means for signalling whether the address information transmitted by said third means the bus lines of said second computing apparatus lies within a second prescribed range of addresses.

7. The system defined in claim 6, wherein said first prescribed range of addresses is identical to said second prescribed range of addresses.

8. The system defined in claim 6, wherein said first and said second prescribed ranges of addresses are adjustable by said first and said second computer apparatus, respectively.

9. The system defined in any one of claims 1 and 2-8 wherein said first and said second computing apparatus are alternately operable in said active and standby modes, respectively, and wherein said improvement further comprises second cross channel circuit means, substantially identical to said first cross channel circuit means, for updating the memory of said first computing apparatus, when said first apparatus is operating in said standby mode, in accordance with changes made in the contents of said random access memory of said second computing apparatus, when said second apparatus is operating in said active mode.

* * * * *